(12) United States Patent
Fahey et al.

(10) Patent No.: US 8,856,829 B2
(45) Date of Patent: Oct. 7, 2014

(54) INTERACTIVE DISPLAY HIGHLIGHT SYSTEMS, METHODS, AND COMPUTER PROGRAM PRODUCTS

(75) Inventors: Christopher Fahey, Brooklyn, NY (US); Christopher Harrington, Greenwich, CT (US); Ryan Hanau, New York, NY (US); Jeff Pizaaz, Brooklyn, NY (US); Chris Geiser, Brooklyn, NY (US); Seth Barrett Coppock, Washington, DC (US)

(73) Assignee: NGC Network US, LLC, Los Angeles, CA (US)

( * ) Notice: Subject to any disclaimer, the term of this patent is extended or adjusted under 35 U.S.C. 154(b) by 564 days.

(21) Appl. No.: 12/648,798

(22) Filed: Dec. 29, 2009
(Under 37 CFR 1.47)

(65) Prior Publication Data
US 2010/0251300 A1    Sep. 30, 2010

Related U.S. Application Data

(60) Provisional application No. 61/141,111, filed on Dec. 29, 2008.

(51) Int. Cl.
| | |
|---|---|
| G06F 3/00 | (2006.01) |
| G06F 13/00 | (2006.01) |
| H04N 5/445 | (2011.01) |
| H04N 21/482 | (2011.01) |
| H04N 21/431 | (2011.01) |
| H04N 21/478 | (2011.01) |

(52) U.S. Cl.
CPC ......... *H04N 5/44543* (2013.01); *H04N 21/482* (2013.01); *H04N 21/478* (2013.01); *H04N 21/4312* (2013.01)
USPC .................................. 725/40; 725/39; 725/42

(58) Field of Classification Search
USPC ............................................... 725/39, 40, 44
See application file for complete search history.

(56) References Cited

U.S. PATENT DOCUMENTS

| | | |
|---|---|---|
| 5,638,522 A | 6/1997 | Dunsmuir et al. |
| 6,424,429 B1 | 7/2002 | Takahashi et al. |
| 2002/0112237 A1* | 8/2002 | Kelts ............................... 725/39 |
| 2003/0018971 A1 | 1/2003 | McKenna, Jr. |
| 2003/0066032 A1 | 4/2003 | Ramachandran et al. |
| 2004/0125150 A1 | 7/2004 | Adcock et al. |
| 2009/0019492 A1* | 1/2009 | Grasset ........................... 725/45 |
| 2009/0113474 A1* | 4/2009 | Green et al. ..................... 725/39 |
| 2011/0179451 A1* | 7/2011 | Miles et al. ..................... 725/42 |

* cited by examiner

*Primary Examiner* — Pankaj Kumar
*Assistant Examiner* — Charles N Hicks
(74) *Attorney, Agent, or Firm* — Cantor Colburn LLP

(57) ABSTRACT

In one example, a user interface is provided for interactively displaying data. The interactive user interface includes: an interactive display window that displays data indicating a schedule of events, wherein the data is displayed according to a first display format; and a highlight selection item that reformats a subset of the displayed data to visually distinguish the subset from the displayed data.

15 Claims, 4 Drawing Sheets

INTERACTIVE DISPLAY HIGHLIGHT SYSTEMS, METHODS, AND COMPUTER PROGRAM PRODUCTS

CROSS-REFERENCES TO RELATED APPLICATIONS

This patent application claims priority to U.S. Provisional Patent Application Ser. No. 61/141,111, filed Dec. 29, 2009, which is incorporated herein by reference in its entirety.

FIELD

The present disclosure relates to methods, systems, and computer program products for interactively displaying data on a user interface.

BACKGROUND

The statements in this section merely provide background information related to the present disclosure and may not constitute prior art.

Viewing a plethora of data displayed by, for example, a webpage, can be a daunting task for users. When the data to be displayed is greater than the amount of data that can be displayed within a user's screen, the user must select a vertical side scroll bar or a horizontal side scroll bar to scroll through the data either horizontally or vertically. The vertical and horizontal scroll bars cannot be used simultaneously. Thus, to access data near the end of a file, the user must first scroll to the bottom of the page and then scroll to the far right of the page. This method of viewing data can be tedious and time consuming.

SUMMARY

In one example, a user interface is provided for interactively displaying data. The user interface includes an interactive display window that displays data indicating a schedule of events, wherein the data is displayed according to a first display format; and a highlight selection item that reformats a subset of the displayed data to visually distinguish the subset from the displayed data.

In another example, an interactive display system is provided. The system includes: a display window manager module that selectively generates schedule data that is displayed within a display window of a user interface according to a first format; and a highlight manager module that reformats a subset of the displayed schedule data to visually distinguish the subset from the displayed schedule data when displayed within the display window of the user interface.

Further areas of applicability will become apparent from the description provided herein. It should be understood that the description and specific examples are intended for purposes of illustration only and are not intended to limit the scope of the present disclosure.

BRIEF DESCRIPTION OF THE SEVERAL VIEWS OF THE DRAWINGS

The drawings described herein are for illustration purposes only and are not intended to limit the scope of the present disclosure in any way. It should be understood that throughout the drawings, corresponding reference numerals indicate like or corresponding parts and features.

DETAILED DESCRIPTION

Figure 1:
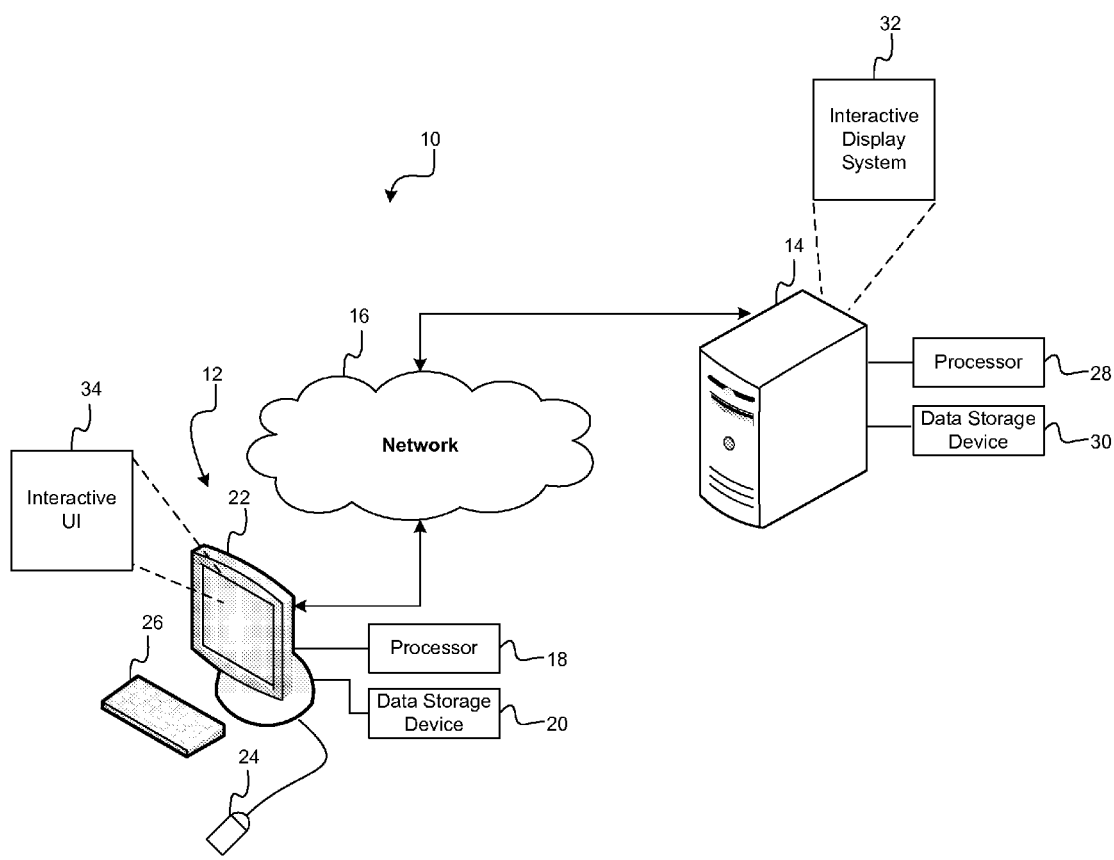
FIG. 1 is a block diagram illustrating a computing system that includes an interactive display system in accordance with an exemplary embodiment of the present disclosure.

Turning now to the drawings in greater detail, it will be seen that in FIG. 1 an exemplary computing system 10 includes an interactive display system of the present disclosure. The exemplary computing system 10 is shown to include a computer 12 that communicates with a server 14 via a network 16. The computer 12 includes a processor 18 and one or more data storage devices 20. The one or more data storage devices 20 can be at least one of random access memory (RAM), read only memory (ROM), a cache, a stack, or the like which may temporarily store electronic data of the computer 12. The processor 18 can be any custom made or commercially available processor, a central processing unit (CPU), an auxiliary processor among several processors associated with the computer, a semiconductor based microprocessor (in the form of a microchip or chip set), a macroprocessor, or generally any device for executing software instructions.

As can be appreciated, the computer 12 can be any computing device that includes a processor 18 and a data storage device 20, including, but not limited to, a desktop computer, a laptop, a workstation, a cell phone, and a personal handheld device. The computer 12 is shown to be associated with a display 22 and one or more input devices 24, 26 that can be used by a user to communicate with the computer 12. As can be appreciated, such input devices 24, 26 can include, but are not limited to, a mouse, a keyboard, and a touchpad.

The server 14 similarly includes one or more processors 28 and one or more data storage devices 30. At least one of the data storage devices 30 of the server 14 stores one or more instructions contained in the interactive display system 32 of the present disclosure. The interactive display system 32 can be accessed by a user of the computer 12 through the network 16 by way of, for example, an Internet Protocol (IP) address. When accessed by a user of the computer 12, the interactive display system 32 generates an interactive user interface 34 that is displayed by the display 22 of the computer 12.

Generally speaking, the interactive user interface 34 allows a user to drag and drop information that is organized and displayed based on a tabular format, for example, data that is organized according to one or more axes or at least one of rows and columns. As used herein, drag and drop actions include a user depressing a selection button of the input device 24, 26, such as the mouse, the user performing a directional movement of the input device 24, 26 while the selection button is depressed, and the user releasing the selection button.

In one example, and as described herein, the interactive user interface 34 can provide a drag and drop feature for information that is organized and displayed based on a calendar of dates and times, where the calendar includes rows that are assigned to various days or dates and columns that are assigned to various times. As can be appreciated, the drag and drop feature of the present disclosure can be applicable to data that is organized according to any tabular format and is not limited to the specific examples as described herein.

Provided the calendar example, the interactive user interface 34 allows a user to view a schedule of events by dragging and dropping a calendar that displays events based on the scheduled day/date and time. When dragging and dropping, the calendar appears to scroll, shift, or slide across a display window. As can be appreciated, the events can be any events that occur at scheduled times. In one example, the events can be, but are not limited to, television programs, sporting events, and/or conference events. For exemplary purposes, the remainder of the disclosure will be discussed in the context of a calendar displaying television programs and/or episodes as the events.

Figure 2:
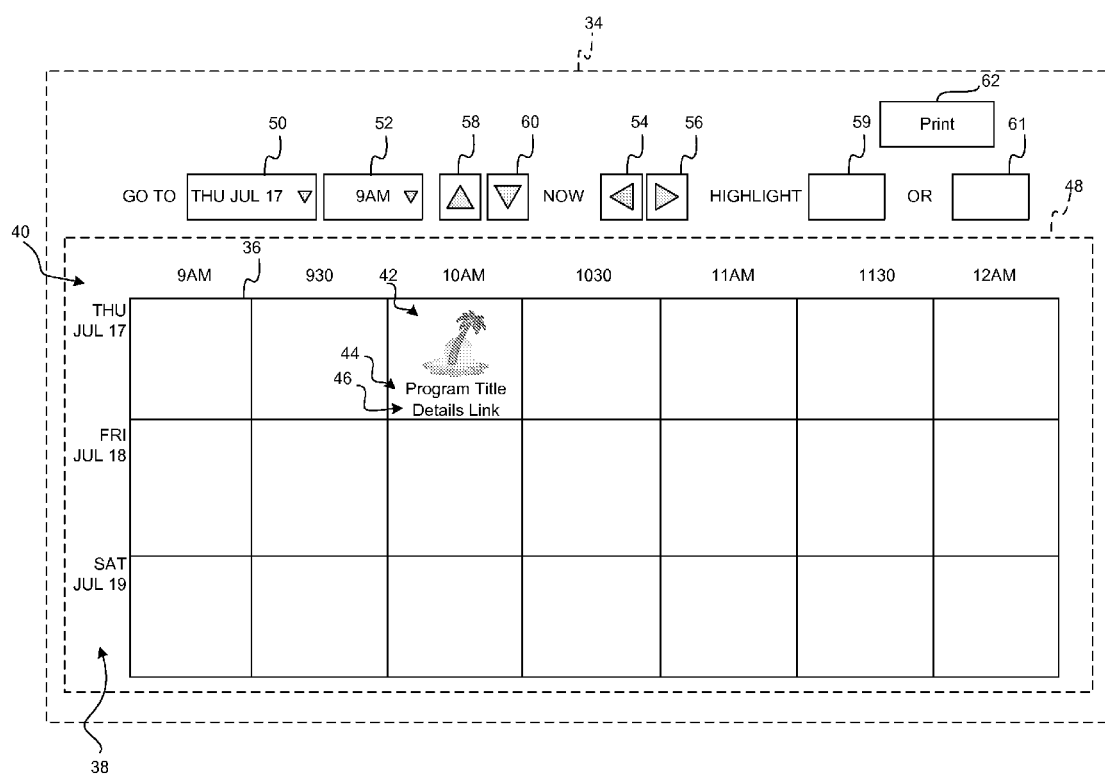
FIG. 2 is a block diagram illustrating an interactive user interface of the interactive display system in accordance with an exemplary embodiment of the present disclosure.

Turning now to FIG. 2, an exemplary interactive user interface 34 is shown in accordance with the present disclosure. In various embodiments, the interactive user interface 34 includes an interactive display window 36. The interactive display window 36 displays television program schedule information according to rows 38 and columns 40 where, each row 38 corresponds to a day or a date within a day/date range and each column 40 corresponds to a time within a time range. At each intersection of a particular row 38 and a particular column 40 is displayed an indicator 42 of the television program that is scheduled at that day/date and time. In various embodiments, the indicator 42 is an image associated with the television program, for example, a scene from the program and/or episode. In various embodiments, the indicator can include text 44 indicating a title or description of the television program, and/or the episode. In various embodiments, the indicator 42 can include a link 46 to additional information about the program/episode (as will be discussed in more detail with regard to FIG. 3).

The interactive display window 36 can be selectively dragged and dropped to adjust the schedule information displayed within the window 36. When the schedule display window 36 is dragged and dropped, the schedule information appears to scroll, shift, or slide from side to side, from top to bottom, and/or diagonally in accordance with the directional movement of the drag and drop.

As shown in FIG. 2, the interactive user interface 34 further includes a frame 48 that surrounds the interactive display window 36, and that displays specific days within the day range and specific times within the time range. The day range and the time range are dynamically determined based on a positioning of the rows 38 and the columns 40 of the schedule information within the interactive display window 36. For example, when a user drags and drops the schedule information from left to right within the interactive display window 36, the columns 40 displayed within the interactive display window 36 slide from left to right, thus revealing new columns of schedule information on the left. The times within the frame 48 that are associated with the columns 40 displayed in the interactive display window 36 slide from left to right, thus revealing new times on the left and adjusting the displayed time range. Similarly, when a user drags and drops the interactive display window 36 from top to bottom, the rows 38 displayed within the interactive display window 36 slide from top to bottom, thus revealing new rows of schedule information on the top. The days/dates within the frame 48 that correspond to the rows 38 slide from top to bottom, thus revealing new days/dates in the top of the frame 48 and adjusting the displayed day range.

The interactive user interface 34 further includes one or more drop-down menus and/or selection buttons for configuring the rows 38 and columns 40 to be displayed within the interactive display window 36. Based on the selections provided by the user via the drop-down menus and/or the selection buttons, the schedule information displayed by the interactive display window 36 and the frame information displayed by the frame 48 are adjusted.

In various embodiments, the interactive user interface 34 includes a calendar drop-down menu 50, a time drop-down menu 52, a left shift button 54, a right shift button 56, an up shift button 58, and a down shift button 60. The calendar drop-down menu 50, when selected, displays a calendar of months near, for example, the present date, or a selected date. The months displayed can be selected based on next month selection buttons. A specific day/date can be selected from the displayed months. Based on the selected day/date, the interactive display window 36 displays the television programs that are scheduled to occur on or near that date, and the frame 48 displays the days/dates near that selected day/date, each by scrolling, sliding, or shifting the displayed data.

The time drop-down menu 52, when selected, displays a listing of times (e.g., 9 am, 9:30, 10 am, 10:30, 11 am, etc.). A specific time can be selected from the listing. Based on the selected time, the interactive display window 36 displays the television programs that are scheduled to occur on or near that time, and the frame 48 displays the times near the selected time, each by scrolling, sliding, or shifting the displayed data.

The left shift button 54 and the right shift button, 56 when selected, adjust the time range displayed within the frame 48 and adjust the corresponding schedule information that is displayed by the interactive display window 36. The time range and the schedule of programs are adjusted by scrolling, sliding, or shifting the displayed information in the selected direction (e.g., left, right). The up shift button 58 and the down shift button 60, when selected, adjust the day/date range displayed within the frame 48 and adjust the corresponding schedule information that is displayed within the interactive display window 36. The day/date range and the schedule of programs are adjusted by scrolling, sliding, or shifting the displayed information in the selected direction (e.g., up, down).

In various embodiments, the interactive user interface 34 includes one or more highlighting selection buttons and/or drop-down menus for selecting a display format for specific television programs. The display format can be a form of highlighting the indicator 42 to distinguish the television program from other television programs displayed within the interactive display window 36. In one example, the form of highlighting can be, but is not limited to, a change in background color, a change in text color, a bolding of text, and an animation.

In one example, the highlighting selection buttons and/or drop-down menus include a theme drop-down menu 59 and a program drop-down menu 61. The theme drop-down menu 59, when selected, displays a drop-down menu that includes a listing of program themes (i.e. science and technology, animals, history and events, people and places, etc.). The theme, when selected, causes event indicators 42 displayed within the interactive display window 36 that are associated with the theme to be highlighted in some fashion, thus distinguishing that program from the others.

The program drop-down menu 61, when selected, displays a drop-down menu that includes a listing of the programs. The programs, when selected, cause event indicators 42 displayed within the interactive display window 36 that are associated with the program to be highlighted in some fashion, thus distinguishing that program from the others.

In various embodiments, the interactive user interface 34 includes a print selection button 62 for selecting a print function. The print function can print to an alternate output (i.e., a second display window, a file, an email, etc.) a schedule of the television programs that is associated with the schedule of programs currently displayed within the interactive display window 36. In one example, the print selection button, when selected, prints to an output file schedule data for a time period (i.e., a week, a month, etc) that includes the day range and the time range displayed by the frame 48.

Figure 3:
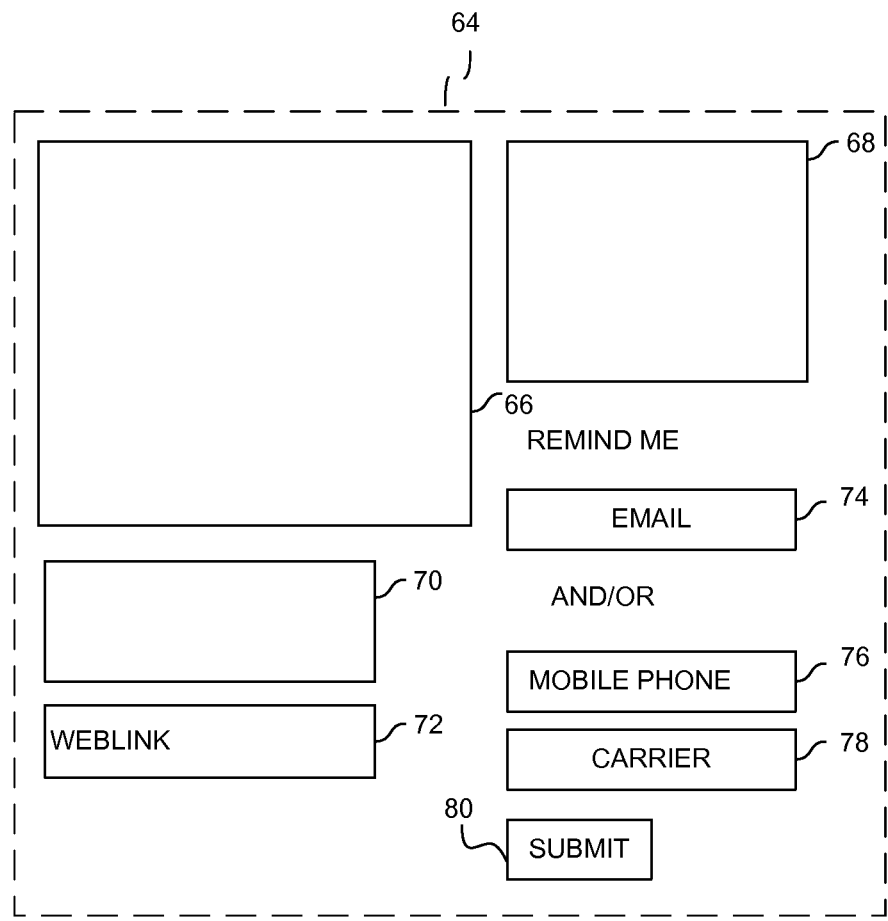
FIG. 3 is a block diagram illustrating a program details interface of the interactive display system in accordance with an exemplary embodiment of the present disclosure.

Turning now to FIG. 3, an exemplary details interface 64 of the interactive user interface 34 is shown in accordance with the present disclosure. A details interface 64 can be displayed for each program based on a selection of the details link 46 of the interactive display window 36 of FIG. 2.

In various embodiments, the details interface 64 includes a details text box 66 and an image display box 68. The details text box 66 displays textual details relating to the selected program and/or episode, such as a summary of the episode, and/or celebrities playing a role in the episode. The image display box 68 displays an image or video clip associated with the program and/or episode. In various embodiments, the image can be the same or different from the image of the indicator 42.

In various embodiments, the details interface 64 further includes a schedule text box 70 and a web link 72. The schedule text box 70 displays the scheduled times and dates that the program and/or episode will be aired. The web link 72 is a link to, for example, WebPages and/or files that are related to the program/episode.

In various embodiments, the details interface 64 includes one or more editable text boxes, selection boxes, and/or drop-down menus for configuring the interactive display system 32 (FIG. 1) to notify the user of the occurrence of the program or episode. In one example, the details interface 64 includes an editable email text box 74, an editable phone number text box 76, a carrier drop-down menu 78, and a submit selection button 80. The editable email text box 74 accepts alphanumeric characters entered by a user indicating an email address. The editable phone number text box 76 accepts numeric characters entered by a user indicating a phone number. The carrier drop-down menu 78, when selected, provides a listing of phone carriers that can be associated with the phone number. The submit selection button 80, when selected, stores the email address and/or the phone number and carrier entered by the user for future notifications.

Figure 4:
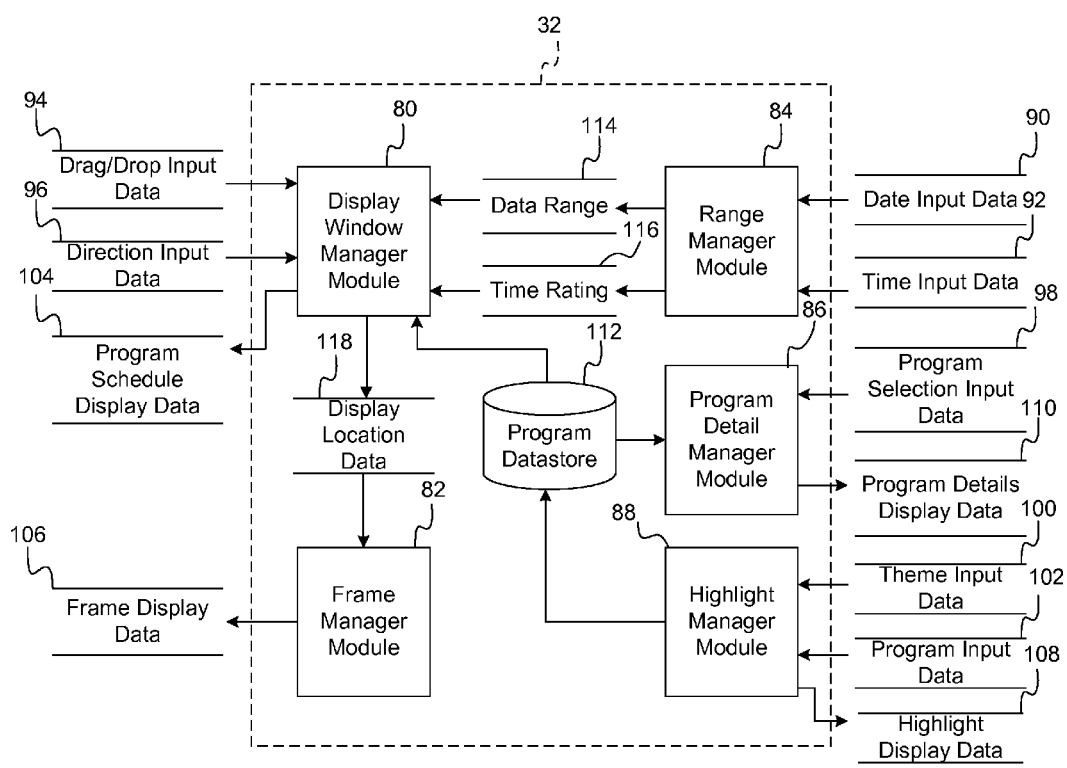
FIG. 4 is a dataflow diagram illustrating the interactive display system in accordance with an exemplary embodiment of the present disclosure.

Turning now to FIG. 4, the interactive display system 32 is shown in more detail in accordance with an exemplary embodiment. The interactive display system 32 includes one or more modules and datastores. As can be appreciated, the modules can be implemented as software, hardware, firmware and/or other suitable components that provide the described functionality. As can be appreciated, the modules shown in FIG. 4 can be combined and/or further partitioned to similarly generate the display data for the interactive user interface 34 (FIG. 1). In this example, the interactive display system 32 includes a display window manager module 80, a frame manager module 82, a range manager module 84, a details manager module 86, and a highlight manager module 88.

The interactive display system 32 receives as input data that is generated based on a user interacting with the interactive user interface 34 (FIG. 2). For example, date input data 90 is generated based on a user selection of an element within the date drop-down menu 50 (FIG. 2). Time input data 92 is generated based on a user selection of an element with the time drop-down menu 52 (FIG. 2). Drag/drop input data 94 is generated based on user drag and drop actions performed within the interactive display window 36 (FIG. 2). Direction input data 96 is generated based on a user selection of at least one of the left shift selection button 54 (FIG. 2), the right shift selection button 56 (FIG. 2), the up shift selection button 58 (FIG. 2), and the down shift selection button 60 (FIG. 2). Program selection input data 98 is generated based on a user selection of the program details link 46 (FIG. 1) for a specific program. The theme input data 100 id generated based on a user selection of the theme drop-down menu 59 (FIG. 2). The program input data 102 is generated based on a user selection of the program drop-down menu 61 (FIG. 1).

Based on the input data 90-102, the interactive display system 32 generates display data that collectively makes up the interactive user interface 34 (FIG. 2). For example, program schedule display data 104 includes data indicating the rows 38 (FIG. 2), and the columns 40 (FIG. 2), of the indicators 42 (FIG. 2) to be displayed within the interactive display window 36 (FIG. 2). Frame display data 106 includes data indicating the date range and the time range to be displayed within the frame 48 (FIG. 2). Highlight display data 108 includes data indicating the program and/or episode to be highlighted and the means for highlighting the program and/or episode within the interactive display window 36 (FIG. 2). Program details display data 110 includes data indicating the program and/or episode details to be displayed by the details user interface 64 (FIG. 3).

The interactive display system 32 further includes a programs datastore 112 that stores data relating to the programs and/or episodes. For example, the programs datastore 112 stores a listing of the television programs and for each program, stores a listing of the episodes and their corresponding show dates and times. The program datastore 112 further stores information associated with each television program, such as a title of the program episode, a theme or topic of the program and/or episode, a summary of the episode, images associated with the program and/or episode, and links to additional information relating to the program. As can be appreciated, the data stored in the programs datastore 112 can be pre-configured.

Turning now to the modules of FIG. 4 in more detail, the range selection module 84 receives as input the date input data 90 and the time input data 92. Based on the inputs 90, 92, the range selection module 84 determines a date range 114 and a time range 116. In various embodiments, the range selection module 84 determines the date range 114 to include the date indicated by the date input data 90. In one example, the range selection module 84 determines the date range 114 to start with the date indicated by the date input data 90. In another example, the range selection module 84 determines the date range 114 such that the date range 114 is centered on the date indicated by the date input data 90. In yet another example, the range selection module 84 determines the date range 114 to end with the date indicated by the date input data 90.

In various embodiments, the range selection module 84 determines the time range 116 to include the date indicated by the time input data 92. In one example, the range selection module 84 determines the time range 116 to start with the time indicated by the time input data 92. In another example, the range selection module 84 determines the time range 116 to be centered on the time indicated by the time input data 92. In yet another example, the range selection module 84 determines the time range 116 to end with the time indicated by the time input data 92.

In various embodiments, the display window manager module 80 receives as input the drag/drop input data 94, the direction input data 96, the date range 114, and the time range 116. Based on the inputs 94, 96, 114, 116, the display window manager module 80 generates the program schedule display data 104. In one example, when the drag/drop input data 94 indicates a specific directional movement, the display window manager module 80 determines the program schedule data in that direction and generates the program schedule display data 104 accordingly. In another example, when the direction input data 96 indicates a directional movement, the display windows manager module 80 determines the program schedule data in that direction and generates the program schedule display data 104 accordingly.

The display window manager module 80 further generates display location data 118 based on the data displayed by the program schedule display data 104. In one example, the display window manager module 80 determines the rows and/or columns that are actually displayed by the display window manager module 80 and generates the display location data 118 accordingly. In another example, the display window manager module 80 determines the coordinates of the data that is displayed by the display window manager module 80 and generates the display location data 118 accordingly.

In various embodiments, the frame manager module 82 receives as input the display location data 118. Based on the display location data 118, the frame manager module 82 generates the frame display data 106. In one example, the frame manager module 82 determines the frame display data 106 to include day information corresponding to the display location data 118 and time information corresponding to the display location data 118.

In various embodiments, the highlight manger module 88 receives as input the theme input data 100 and the program input data 102. Based on the inputs 100, 102, the highlight manager module 88 generates the highlight display data 108. In one example, based on the theme input data 100, the highlight manager module 88 evaluates the data in the programs datastore 112 to determine programs and/or episodes that are classified under the theme indicated by the theme input data 100. The highlight manager module 88 generates the highlight display data 108 based on the classified programs and/or episodes. In another example, based on the program input data 102, the highlight manager module 88 evaluates the data stored in the programs datastore 112 to determine the programs and/or episodes that are associated with the program indicated by the program input data 102. The highlight manager module 88 then generates the highlight display data 108 based on the associated programs and/or episodes.

In various embodiments, the program details manager module 86 receives as input the program selection input data 98. Based on the input 98, the program detail manager module 86 retrieves from the programs datastore 112 the program and/or episode data for the program and/or episode indicated by the program selection input data 98 and generates the program details display data 110 accordingly.

As one example, one or more aspects of the present disclosure can be included in an article of manufacture (e.g., one or more computer program products) having, for instance, computer usable media. The media has embodied therein, for instance, computer readable program code means for providing and facilitating the capabilities of the present disclosure. The article of manufacture can be included as a part of a computer system or provided separately.

Additionally, at least one program storage device readable by a machine, tangibly embodying at least one program of instructions executable by the machine to perform the capabilities of the present disclosure can be provided.

Computer program code for carrying out operations of the present invention may be written in any combination of one or more programming languages, including an object oriented programming language such as XML, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An interactive user interface, comprising:
   non-transitory computer-readable medium in communication with one or more processors and having one or more computer programs stored thereon including a set of instructions that when executed by said one or more processors that causes the one or more processes to perform operations for presentation of said interactive user interface;
   an interactive display window that displays data indicating a schedule of a plurality of events, wherein the data is displayed according to a first display format; and
   a highlight selection item that reformats a subset of the displayed data to visually distinguish the subset from the displayed data, the subset comprising plural discrete event entries, wherein the interactive user interface is operatively associated with a user display that renders the display window on the user display monitor and user input, the user input configured to interface with a displayed interactive user interface and to effect highlighting;
   wherein the interactive display window displays data according to a tabular format including one or more rows and one or more columns, and wherein the displayed data is dynamically displayed within the interactive display window based on a drag and drop user action performed within the display window; wherein the user interface additionally comprises a frame that surrounds the display window and that dynamically displays a first range of first axis data corresponding to the one or more rows and a second range of second axis data corresponding to the one or more columns, wherein the interactive user interface is operatively associated with a user display and user input, the user input configured to interface with a displayed interactive user interface and selectively drag and drop portions thereof;
   wherein the highlight selection item is a drop-down menu that lists one or more elements; and
   wherein said drop down menu is outside of said frame and effects highlighting in said frame.

2. The user interface of claim 1 wherein the events include television programs.

3. The user interface of claim 1 wherein the highlight selection item determines the subset according to a theme.

4. The user interface of claim 3 wherein the events include television programs and wherein the highlight selection item determines the subset according to the theme of television programs.

5. The user interface of claim 1 wherein the highlight selection item determines the subset according to a specific program.

6. The user interface of claim 5 wherein the events include television programs and wherein the highlight selection item determines the subset according to the specific program of the television programs.

7. The user interface of claim 1 further comprising a second selection item that reformats a second subset of the displayed data to visually distinguish the second subset from the displayed data and the subset, wherein the highlight selection item determines the subset according to a theme of television programs, and wherein the second selection time determines the second subset according to a specific program of the television programs.

8. The user interface of claim 1 wherein the reformatting includes at least one of changing a background color, changing a text color, bolding of text data, and animating data.

9. An interactive display system, the system comprising:
a display window manager module that selectively generates schedule data that is displayed within a display window of a user interface according to a first format;
a highlight manager module that reformats a subset of the displayed schedule data to visually distinguish the subset from the displayed schedule data when displayed within the display window of the user interface, the subset comprising plural discrete event entries, wherein the interactive user interface is operatively associated with a user display and user input, the user input configured to interface with a displayed interactive user interface and to effect highlighting;
wherein the display window manager module displays data according to a tabular format including one or more rows and one or more columns, and wherein the displayed data is dynamically displayed within the interactive display window based on a drag and drop user action performed within the display window; wherein the user interface additionally comprises a frame that surrounds the display window and that dynamically displays a first range of first axis data corresponding to the one or more rows and a second range of second axis data corresponding to the one or more columns, wherein the interactive user interface is operatively associated with a user display and user input, the user input configured to interface with a displayed interactive user interface and selectively drag and drop portions thereof;
wherein the highlight selection item is a drop-down menu that lists one or more elements; and
wherein said drop down menu is outside of said frame and effects highlighting in said frame.

10. The system of claim 9 wherein the schedule data includes data indicating scheduled television programs.

11. The system claim 9 wherein the highlight manager module determines the subset according to a theme.

12. The system of claim 11 wherein the schedule data includes data indicating scheduled television programs, and wherein the highlight manager module determines the subset according to a theme of television programs.

13. The system of claim 9 wherein the highlight manager module determines the subset according to an event.

14. The system of claim 13 wherein the events include television programs and wherein the highlight manager module determines the subset according to a specific program of the television programs.

15. The system of claim 9 wherein the highlight manager module reformats the subset of the displayed schedule data by at least one of changing a background color, changing a text color, bolding of text data, and animating data.

* * * * *